US011148626B2

(12) United States Patent
Choi (10) Patent No.: US 11,148,626 B2
(45) Date of Patent: Oct. 19, 2021

(54) METHOD OF CONTROLLING AIRBAG INFLATOR

(71) Applicants:Hyundai Motor Company, Seoul (KR); Kia Motors Corporation, Seoul (KR)

(72) Inventor: Jun Yeol Choi, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 230 days.

(21) Appl. No.: 16/432,607

(22) Filed: Jun. 5, 2019

(65) Prior Publication Data

US 2020/0189509 A1   Jun. 18, 2020

(30) Foreign Application Priority Data

Dec. 14, 2018   (KR) .................. 10-2018-0162087

(51) Int. Cl.
  *B60R 21/015*    (2006.01)
  *B60R 21/0132*   (2006.01)
  (Continued)

(52) U.S. Cl.
  CPC .... *B60R 21/01554* (2014.10); *B60R 21/0132* (2013.01); *B60R 21/01544* (2014.10);
  (Continued)

(58) Field of Classification Search
  CPC ........ B60R 21/01554; B60R 21/01562; B60R 21/0132; B60R 2021/01013;
  (Continued)

(56) References Cited

U.S. PATENT DOCUMENTS

| 5,400,487 A | 3/1995 | Gioutsos et al. |
| 5,413,378 A | 5/1995 | Steffens, Jr. et al. |

(Continued)

FOREIGN PATENT DOCUMENTS

| EP | 1 323 594 A2 | 7/2003 |
| EP | 1 564 087 A1 | 8/2005 |

(Continued)

OTHER PUBLICATIONS

Extended European Search Report dated Jan. 3, 2020 for European Patent Application No. 19178320.8.

(Continued)

*Primary Examiner* — Tyler J Lee
*Assistant Examiner* — Yufeng Zhang
(74) *Attorney, Agent, or Firm* — Morgan, Lewis & Bockius LLP (57) ABSTRACT

A method of controlling an airbag inflator, may include determining, when an occupant is accommodated on a seat, whether the weight of the occupant is in which of first to fourth weight ranges sequentially allocated by a controller, performing a first logic for operating an inflator at the lowest one of three intensities by the controller when it is determined that the weight of the occupant is in the lightest first weight range, and performing a second logic for operating the inflator at the intermediate intensity or a third logic for operating the inflator at the highest intensity by the controller, according to conditions such as a position of a seat, a state of operation of a recliner, a collision condition, a collision pulse, and wearing of a belt, when it is determined that the weight of the occupant is in the third or fourth weight range.

11 Claims, 10 Drawing Sheets

(51) Int. Cl.
*B60R 21/01* (2006.01)
*B60R 21/26* (2011.01)

(52) U.S. Cl.
CPC .................. *B60R 21/01562* (2014.10); *B60R 2021/01013* (2013.01); *B60R 2021/01231* (2013.01); *B60R 2021/01265* (2013.01); *B60R 2021/01322* (2013.01); *B60R 2021/26029* (2013.01)

(58) Field of Classification Search
CPC ........... B60R 2021/01231; B60R 2021/01265; B60R 2021/01322; B60R 2021/26029
See application file for complete search history.

(56) References Cited

U.S. PATENT DOCUMENTS

| | | | |
|---|---|---|---|
| 5,622,380 | A | 4/1997 | Khandhadia et al. |
| 6,341,252 | B1 | 1/2002 | Foo et al. |
| 8,556,294 | B1 | 10/2013 | Norman, III |
| 9,452,729 | B2 | 9/2016 | Bierwirth et al. |
| 9,463,765 | B1 | 10/2016 | Mayville |
| 2005/0184498 | A1 | 8/2005 | Trevillyan et al. |
| 2008/0257195 | A1 | 10/2008 | Nakayasu et al. |
| 2010/0071580 | A1 | 3/2010 | Nakayasu et al. |
| 2016/0052483 | A1 | 2/2016 | Bierwirth et al. |
| 2016/0137153 | A1 | 5/2016 | Kim |
| 2017/0361796 | A1 | 12/2017 | Kim et al. |

FOREIGN PATENT DOCUMENTS

| | | |
|---|---|---|
| JP | 2000-313304 A | 11/2000 |
| KR | 10-2005-0045329 A | 5/2005 |
| KR | 10-0511120 B1 | 8/2005 |
| WO | WO 99/42339 A1 | 8/1999 |

OTHER PUBLICATIONS

European Search Report dated Aug. 8, 2019 for European Patent Application No. 19178336.4.

METHOD OF CONTROLLING AIRBAG INFLATOR

CROSS REFERENCE TO RELATED APPLICATION

The present application claims priority of Korean Patent Application No. 10-2018-0162087 filed on Dec. 14, 2018, the entire contents of which is incorporated herein for all purposes by this reference.

BACKGROUND OF THE DISCLOSURE

Field of the Disclosure

The present invention relates to a method of controlling an airbag inflator, and more particularly, to a technique for controlling a discharge pressure of explosive gas in various manners according to the type of collision and the condition of an occupant.

Description of Related Art

In general, an airbag is a device disposed in a vehicle for protecting an occupant from collision impact in the event of vehicle collision, and prevents the occupant from directly colliding with the vehicle by inflating the airbag with the explosive gas generated in an inflator.

The deployment process of a typical airbag is as follows.

When an impact is transmitted to the vehicle body in the event of collision of the vehicle, the impact is detected by various sensors disposed in the vehicle and the detection signals detected by the sensors are transmitted to an airbag control unit (ACU). As such, the ACU determines the detection signals transmitted thereto to determine whether or not to deploy the airbag according to the intensity of the impact energy. When the ACU determines that it is necessary to deploy the airbag, it transmits an operation signal to an inflator. When the operation signal is applied to the inflator, explosive gas is generated by explosion of the explosive filled in the inflator with the igniter provided therein, resulting in inflation of the airbag.

Airbags have been continuously studied due to various reasons such as reinforcement of safety standards required for vehicles and structural changes thereof. In recent years, a technique has been researched for controlling the pressure of explosive gas generated in an inflator according to the type of collision response and the condition of an occupant.

In recent years, an inflator has been provided in which its internal space is partitioned into accommodation spaces having respective igniters, the partitioned accommodation spaces are filled with respective explosives, and then the igniters are individually operated. Such an inflator may control the generated explosive gas to have two or more pressures, but there is a limit in controlling the discharge pressure of the explosive gas in more various manners.

The foregoing is intended merely to aid in the understanding of the background of the present invention, and is not intended to mean that the present invention falls within the purview of the related art which is already known to those skilled in the art.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a method of controlling an airbag inflator, configured for maximizing vehicle safety by appropriately controlling an airbag inflator, which can control a discharge pressure of explosive gas in various manners, according to the type of collision and the condition of an occupant to realize optimized airbag deployment that can minimize injury even for different types of occupants.

In accordance with an aspect of the present invention, a method of controlling an airbag inflator may include determining, when an occupant is accommodated on a seat, whether the weight of the occupant is in which of first to fourth weight ranges sequentially allocated by a controller, performing a first logic for operating an inflator at the lowest one of three intensities by the controller when it is determined that the weight of the occupant is in the lightest first weight range, and performing a second logic for operating the inflator at the intermediate intensity or a third logic for operating the inflator at the highest intensity by the controller, according to conditions such as a position of a seat, a state of operation of a recliner, a collision condition, a collision pulse, and wearing of a belt, when it is determined that the weight of the occupant is in the third or fourth weight range.

When the weight of the occupant is in the second weight range and the seat is positioned forward, the controller may perform the first logic.

In the performing a second logic or a third logic, when the seat is positioned forward, the controller may be configured to determine a collision condition for high-speed collision or low-speed collision according to the magnitude of collision acceleration, in which case the controller may be configured to determine a collision pulse when the collision condition is determined as the high-speed collision, so that the second logic may be performed when the collision pulse is a delay pulse, whereas the third logic may be performed when the collision pulse is a normal pulse.

In the performing a second logic or a third logic, when the seat is positioned forward, the controller may be configured to determine a collision condition for high-speed collision or low-speed collision according to the magnitude of collision acceleration, in which case the controller may be configured to determine a collision pulse when the collision condition is determined as the low-speed collision, so that the second logic may be performed when the collision pulse is a delay pulse, whereas the controller may be configured to determine whether the safety belt is worn when the collision pulse is a normal pulse, in which case the second logic may be performed when it is determined that the safety belt is worn whereas the third logic may be performed when it is determined that the safety belt is not worn.

In the performing a second logic or a third logic, when the seat is positioned rearward thereof, the controller may perform the second logic when the recliner is in a relax state in which the recliner is tilted rearward thereof.

In the performing a second logic or a third logic, when the seat is positioned rearward thereof, the controller may be configured to determine a collision condition for high-speed collision or low-speed collision according to the magnitude of collision acceleration when the recliner is in a normal state in which the recliner is not tilted rearward thereof, so that when the collision condition is determined as the low-speed collision, the second logic may be performed.

In the performing a second logic or a third logic, when the seat is positioned rearward thereof, the controller may be configured to determine a collision condition for high-speed collision or low-speed collision according to the magnitude of collision acceleration when the recliner is in a normal state in which the recliner is not tilted rearward thereof, in which case the controller may be configured to determine a collision pulse when the collision condition is determined as the high-speed collision, so that the second logic may be performed when the collision pulse is a delay pulse, whereas the third logic may be performed when the collision pulse is a normal pulse.

The collision condition may be determined as high-speed collision when the average value of collision acceleration for a predetermined first reference time in the initial stage of vehicle collision is equal to or greater than a predetermined reference acceleration, whereas the collision condition may be determined as low-speed collision when the average value of collision acceleration is less than the reference acceleration.

The collision pulse may be determined as a normal pulse when the rising gradient of collision acceleration during a predetermined second reference time in the initial stage of vehicle collision is equal to or greater than a predetermined reference gradient, whereas the collision pulse may be determined as a delay pulse when the rising gradient of collision acceleration is less than the reference gradient.

As apparent from the above description, the present invention can maximize vehicle safety by appropriately controlling the airbag inflator, which can control the discharge pressure of explosive gas in various manners, according to the type of collision and the condition of an occupant to realize the optimized airbag deployment that can minimize injury even for different types of occupants.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

First, the construction and operation of an airbag inflator to which the present invention is applicable will be described with reference to FIGS. 1 to 9.

Figure 1:
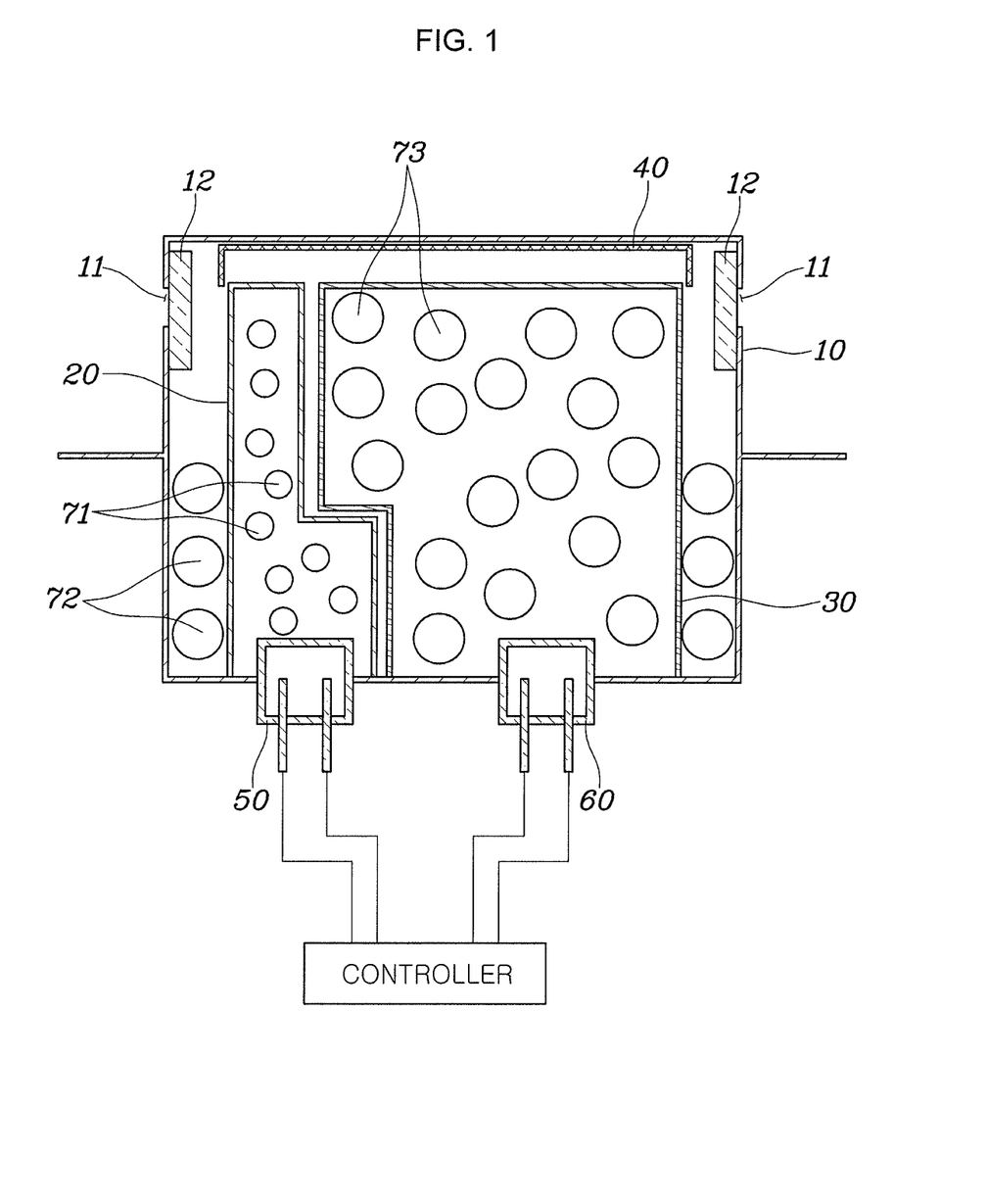
FIG. 1 is a schematic view exemplarily illustrating an airbag inflator to which the present invention is applicable.

As illustrated in the drawings, the airbag inflator to which the present invention is applicable includes a housing 10 having an accommodation space defined therein and filled with a first explosive 72, a first chamber 20 movably provided in the accommodation space of the housing 10 and filled with a booster 71, a second chamber 30 movably provided in the accommodation space of the housing 10 separately from the first chamber 20 and filled with a second explosive 73, a first igniter 50 for exploding the booster 71 by an operation signal, and a second igniter 60 for exploding the second explosive 73 by an operation signal.

The housing 10 has the accommodation space defined therein for movably providing the first and second chambers 20 and 30. In the accommodation space within the housing 10, the first explosive 72 is filled in a remaining region except for the space in which the first and second chambers 20 and 30 are disposed.

The housing 10 has a plurality of gas outlets 11 formed in the upper side surface thereof for discharging the explosive gas generated by the explosion of the first and second explosives 72 and 73 and the booster 71 to an airbag. In the instant case, a filter 12 may be disposed at each of the gas outlets 11 to filter particles contained in the explosive gas discharged to the airbag.

The first and second igniters 50 and 60 are spaced from each other on the lower surface of the housing 10.

The first and second chambers 20 and 30 are filled with the booster 71 and the second explosive 73, respectively, and are configured to selectively block or expose the booster 71 and the second explosive 73 from or to the first explosive 72. Accordingly, the first chamber 20 is moved by the explosion of the booster 71 so that the flame ignited by the booster 71 explodes the first explosive 72 filled in the housing 10. The second chamber 30 is moved by the explosion of the second explosive 73 so that the flame ignited by the second explosive 73 explodes the first explosive 72 filled in the housing 10.

For example, the first chamber 20 has an opening 25 formed in the lower surface thereof and is disposed to cover the first igniter 50. The flame due to the explosion of the booster 71 is exposed to the first explosive 72 through the opening 25 while the first chamber 20 is moved upward by the explosion of the booster 71, allowing the first explosive 72 to be exploded. Similar to the first chamber 20, the second chamber 30 has an opening 35 formed in the lower surface thereof and is disposed to cover the second igniter 60. The flame due to the explosion of the second explosive 73 is exposed to the first explosive 72 while the second chamber 30 is moved upward by the explosion of the second explosive 73, allowing the first explosive 72 to be exploded.

Figure 2:
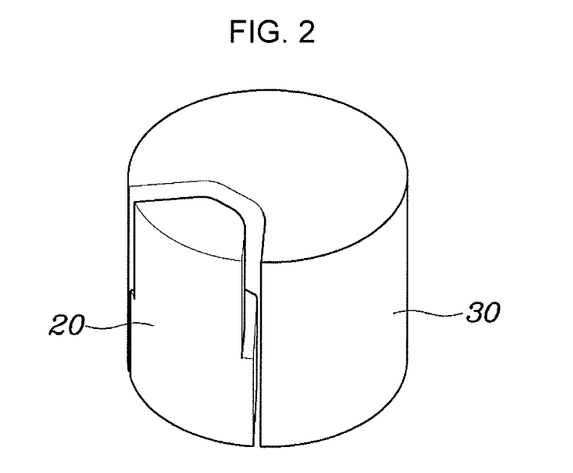
FIG. 2 and FIG. 3 are views illustrating the first and second chambers of FIG. 1.
Figure 3:
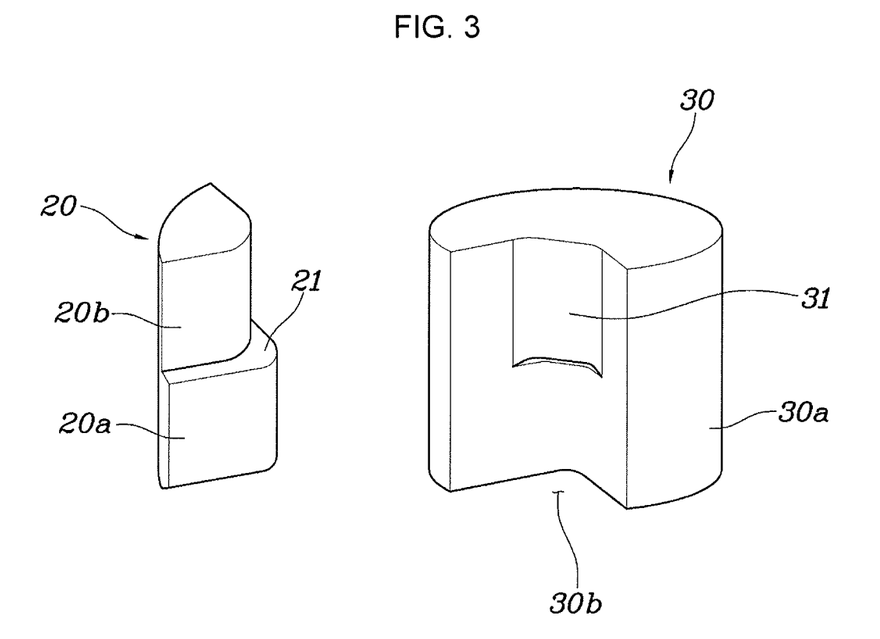

As illustrated in FIG. 2 and FIG. 3, the first chamber 20 has a housing shape which is open at the lower surface thereof, and has a fan shape in horizontal cross section. The first chamber 20 is divided into a lower chamber 20a and an upper chamber 20b in a vertical direction thereof. The cross section of the upper chamber 20b is smaller than that of the lower chamber 20a. Thus, a step 21 is formed between the upper chamber 20b and the lower chamber 20a.

The second chamber 30 has a housing shape which is open at the lower surface thereof, and includes a chamber body 30a having an installation groove 30b formed in the side surface thereof, wherein the installation groove 30b corresponds to the shape of the first chamber 20. Accordingly, the second chamber 30 forms a cylindrical shape together with the first chamber 20 disposed in the installation groove 30b. The chamber body 30a has a protrusion 31 protruding to correspond to the step 21 of the first chamber 20.

The lower end portions of the first and second chambers 20 and 30 are in close contact with the lower surface of the housing 10 to block their internal spaces from the outside. The first and second chambers 20 and 30 have the same height. However, a predetermined gap is formed between the upper surface of the step 21 and the lower surface of the protrusion 31 to provide a space in which the first chamber 20 is movable separately from the second chamber 30. Therefore, the sum of the height of the step 21 and the height of the protrusion 31 is smaller than the heights of the first and second chambers 20 and 30.

When only the first chamber 20 is moved upward, the first chamber 20 is raised by the gap between the upper surface of the step 21 and the lower surface of the protrusion 31 so that the lower end portion of the first chamber 20 is spaced from the lower surface of the housing 10. The first chamber 20 is tilted according to which the step 21 of the first chamber 20 comes into contact with the protrusion 31 of the second chamber 30 by the force acting on first chamber 20 for continuing to move upward, and the distance between the lower end portion of the first chamber 20 and the lower surface of the housing 10 is thus increased (Case 1).

When the first chamber 20 is first moved upward and the second chamber 30 is sequentially moved upward, the first chamber 20 is raised and then tilted, similarly to when only the first chamber 20 is moved upward as described above, and the lower end portion of the second chamber 20 is then spaced from the lower surface of the housing 10 while the second chamber 30 is moved upward (Case 2).

When both of the first and second chambers 20 and 30 are moved upward, the lower end portions of the first and second chambers 20 and 30 are spaced from the lower surface of the housing 10 (Case 3).

The housing 10 has a guide holder 40 provided at the upper side of the internal space thereof for guiding the upward movement of the first and second chambers 20 and 30. For example, the guide holder 40 has a shape corresponding to the state in which the first chamber 20 is disposed in the installation groove 30b of the second chamber 30.

Meanwhile, the airbag inflator according to the exemplary embodiment of the present invention further includes a controller for individually providing an operation signal to the first and second igniters 50 and 60 to adjust the ignition timing of the first and second igniters 50 and 60 according to a predetermined control logic for each situation.

The controller selects a first logic for igniting only the first igniter 50, a second logic for igniting the first igniter 50 and then igniting the second igniter 60, or a third logic for simultaneously igniting the first and second igniters 50 and 60 according to the predetermined control logic for each situation to provide an operation signal to the first and second igniters 50 and 60. In the instant case, when the controller selects the second logic, it can adjust a time interval until the first igniter 50 is ignited and the second igniter 60 is ignited.

Accordingly, the first and second chambers 20 and 30 are selectively operated according to one of the above Cases 1 to 3 by the selection from the first to third logics.

Meanwhile, the controller may be an airbag control unit (ACU). Accordingly, the controller provides an operation signal to the first and second igniters according to the type of collision response and the condition of an occupant determined from various sensors disposed in the vehicle. For example, the type of collision response and the condition of an occupant determined by the signals detected from various sensors disposed in the vehicle may include an occupant's position, an occupant's weight and size, a seat's position and posture, a reclining angle, a collision speed, whether or not a safety belt is worn, and the like.

The state of operation of the airbag inflator having the above configuration to which the present invention is applicable will be described with reference to the drawings.

Figure 4:
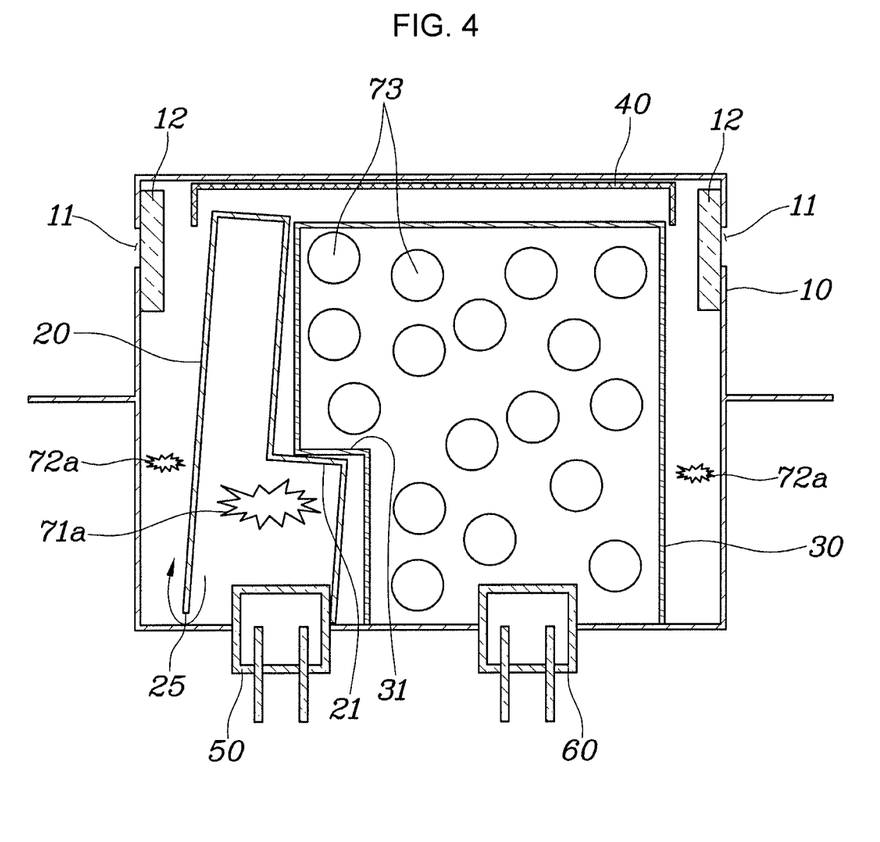
FIG. 4, FIG. 5 and FIG. 6 are views illustrating a state of operation of the airbag inflator of FIG. 1.
Figure 5:
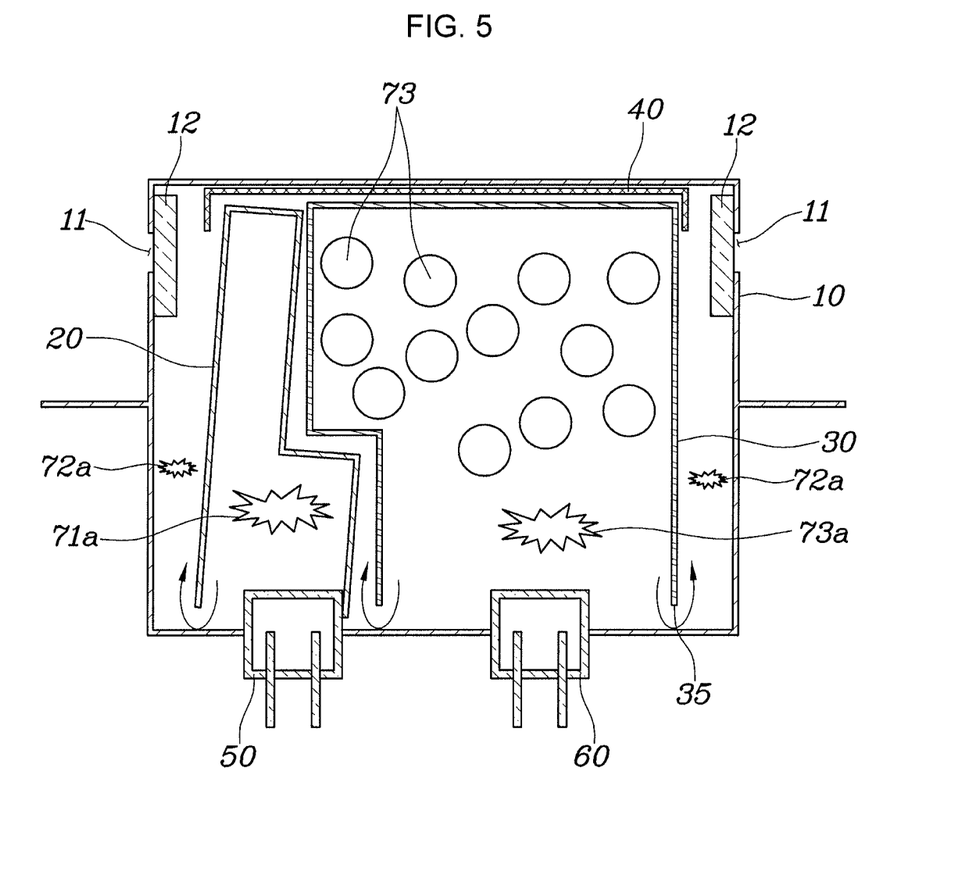
Figure 6:
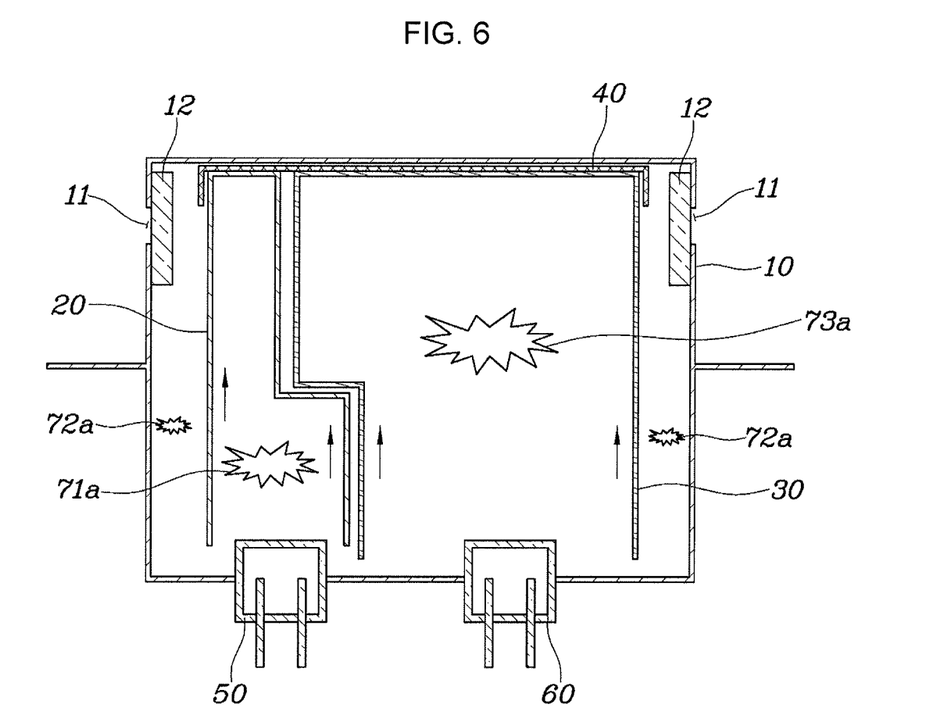
Figure 7:
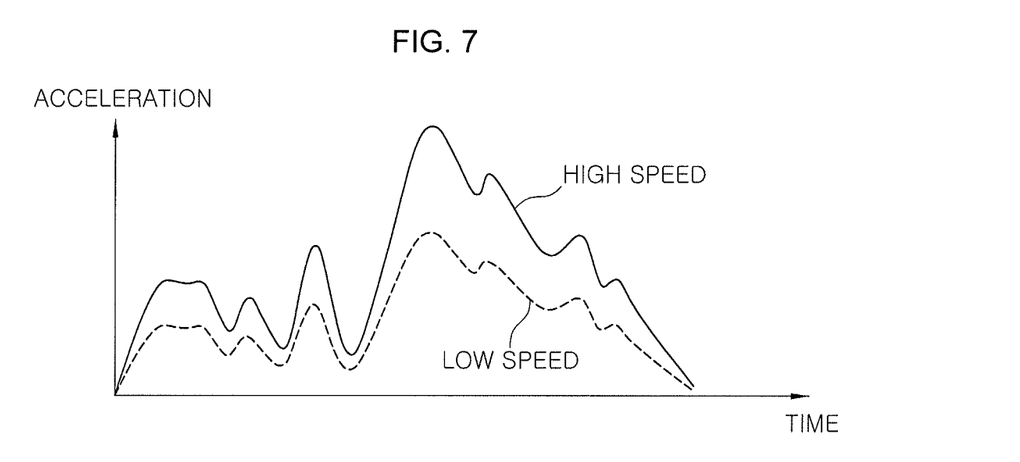
FIG. 7 and FIG. 8 are graphs illustrating an example of waveform analysis for distinguishing collision pulses to control the operation of the airbag inflator of FIG. 1.
Figure 8:
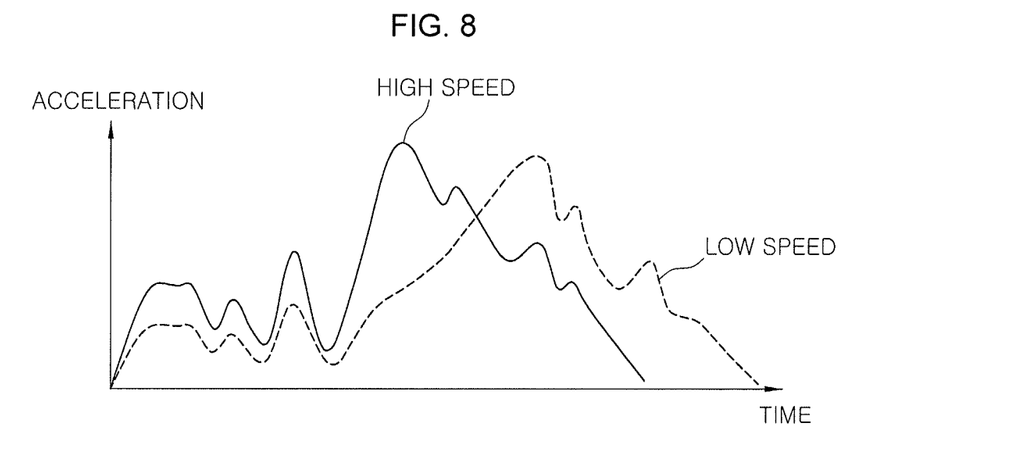

FIG. 4, FIG. 5 and FIG. 6 are views illustrating the state of operation of the airbag inflator. FIG. 4 is a view corresponding to Case 1, FIG. 5 is a view corresponding to Case 2, and FIG. 6 is a view corresponding to Case 3.

First, the state of operation of the airbag inflator corresponding to Case 1 will be described with reference to FIG. 4.

Case 1 is a situation where the controller is operated in the event of low-speed collision or when a small occupant is boarded according to the type of collision response and the condition of an occupant determined from various sensors disposed in the vehicle, in which case the discharge pressure is reduced to cope with LRD performance.

When it is determined that the above Case 1 occurs, the controller carries out the first logic for igniting only the first igniter 50 without igniting the second igniter 60.

As such, an operation signal is applied to the first igniter 50 by the controller so that the first igniter 50 is ignited to explode the booster filled in the first chamber 20. In the instant case, the first chamber 20 is moved upward by the explosive power of the booster 71 exploded therein. However, the first chamber 20 is raised by the gap between the upper surface of the step 21 and the lower surface of the protrusion 31 so that the lower end portion of the first chamber 20 is spaced from the lower surface of the housing 10. Accordingly, the flame 71a in the first chamber 20 is transferred to the first explosive 72 filled in the housing 10 and the first explosive 72 is exploded while generating the flame 72a. As such, the explosive gas generated by the explosion of the booster 71 and the first explosive 72 is discharged through the gas outlets 11 of the housing 10 so that the airbag begins to inflate.

Subsequently, the step 21 of the first chamber 20 comes into contact with the protrusion 31 of the second chamber 30 by the force acting on the first chamber 20 for continuing to move upward, and the first chamber 20 is thus tilted so that the distance between the lower end portion of the first chamber 20 and the lower surface of the housing 10 is increased. As such, the amount of the flame 71*a* in the first chamber 20 transferred to the first explosive 72 filled in the housing 10 is gradually increased so that the first explosive 72 is increased in quantity and the pressure of explosive gas is increased.

Next, the state of operation of the airbag inflator corresponding to Case 2 will be described with reference to FIG. 5.

Case 2 is a situation where the controller is operated in the event of medium-speed collision or when an occupant is positioned at a distance from the airbag according to the type of collision response and the condition of an occupant determined from various sensors disposed in the vehicle, in which case the discharge pressure is reduced in the initial stage but it may be increased in the middle stage and the discharge pressure in the middle stage may be maintained in the late stage.

When it is determined that the above Case 2 occurs, the controller carries out the second logic for igniting the first igniter 50 and then igniting the second igniter 60.

As such, an operation signal is first applied to the first igniter 50 by the controller so that the first igniter 50 is operated as in the above Case 1. Accordingly, the explosive gas generated by the explosion of the booster 71 and the first explosive 72 is discharged through the gas outlets 11 of the housing 10 so that the airbag begins to inflate in the initial stage.

Subsequently, i.e., in a predetermined time period, the second igniter 60 is ignited to explode the second explosive 73 filled in the second chamber 30. In the instant case, the second chamber 30 is moved upward by the explosive power of the second explosive 73 exploded therein so that the lower end portion of the second chamber 30 is spaced from the lower surface of the housing 10. As such, the flame 73*a* in the second chamber 30 is transferred to the first explosive 72 filled in the housing 10 so that the first explosive 72 is increased in quantity and the second explosive 73 is increased in quantity, with the consequence that the pressure of explosive gas is increased compared to in the initial stage.

Next, the state of operation of the airbag inflator corresponding to Case 3 will be described with reference to FIG. 6.

Case 3 is a situation where the controller is operated in the event of high-speed collision or when a large occupant is boarded according to the type of collision response and the condition of an occupant determined from various sensors disposed in the vehicle, in which case the initial discharge pressure and the maximum discharge pressure may be kept high.

In an exemplary embodiment of the present invention, the high-speed collision is a collision in which the vehicle moves higher than the second predetermined speed.

When it is determined that the above Case 3 occurs, the controller carries out the third logic for simultaneously igniting the first and second igniters 50 and 60.

As such, an operation signal is simultaneously applied to the first and second igniters 50 and 60 so that first and second igniters 50 and 60 are ignited together. As such, the booster 71 filled in the first chamber 20 is exploded together with the second explosive 73 filled in the second chamber 30 to raise the first and second chambers 20 and 30 together. Thus, the lower end portions of the first and second chambers 20 and 30 are spaced from the lower surface of the housing 10. Accordingly, the flames 71*a* and 73*a* in the first and second chambers 20 and 30 are transferred to the first explosive 72 filled in the housing 10 and the first explosive 72*a* is exploded while generating the flame 72*a*. Thus, the discharge pressure of explosive gas generated by the explosion of the booster 71 and the first and second explosives 72 and 73 is kept high from the initial stage and the maximum discharge pressure is also kept high.

Figure 9:
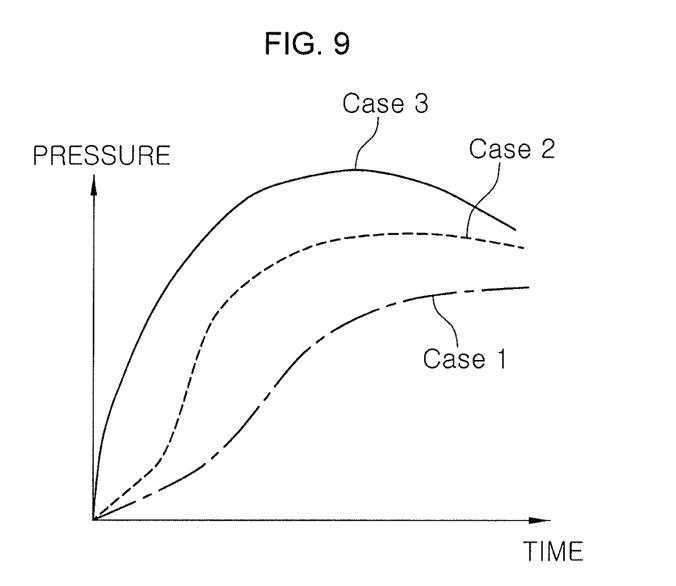
FIG. 9 is a graph illustrating an example in which the pressure of discharge gas from the airbag inflator of FIG. 1 is adjusted for each time.

FIG. 9 is a graph illustrating an example in which the pressure of discharge gas from the airbag inflator according to the exemplary embodiment of the present invention is adjusted for each time, and illustrates the discharge pressure of explosive gas for each time according to the above Cases 1 to 3.

As seen in FIG. 9, it may be seen that in Case 1, the discharge pressure is relatively low in the initial stage and it is relatively low even in the middle and late stages.

It may be seen that in Case 2, the discharge pressure is higher than that in Case 1 but it is relatively low in the initial stage, and the discharge pressure is increased from the middle stage and the increased discharge pressure is maintained until the late stage.

In Case 3, the discharge pressure is kept relatively high from the initial stage and it is kept high until the middle and late stages.

Figure 10:
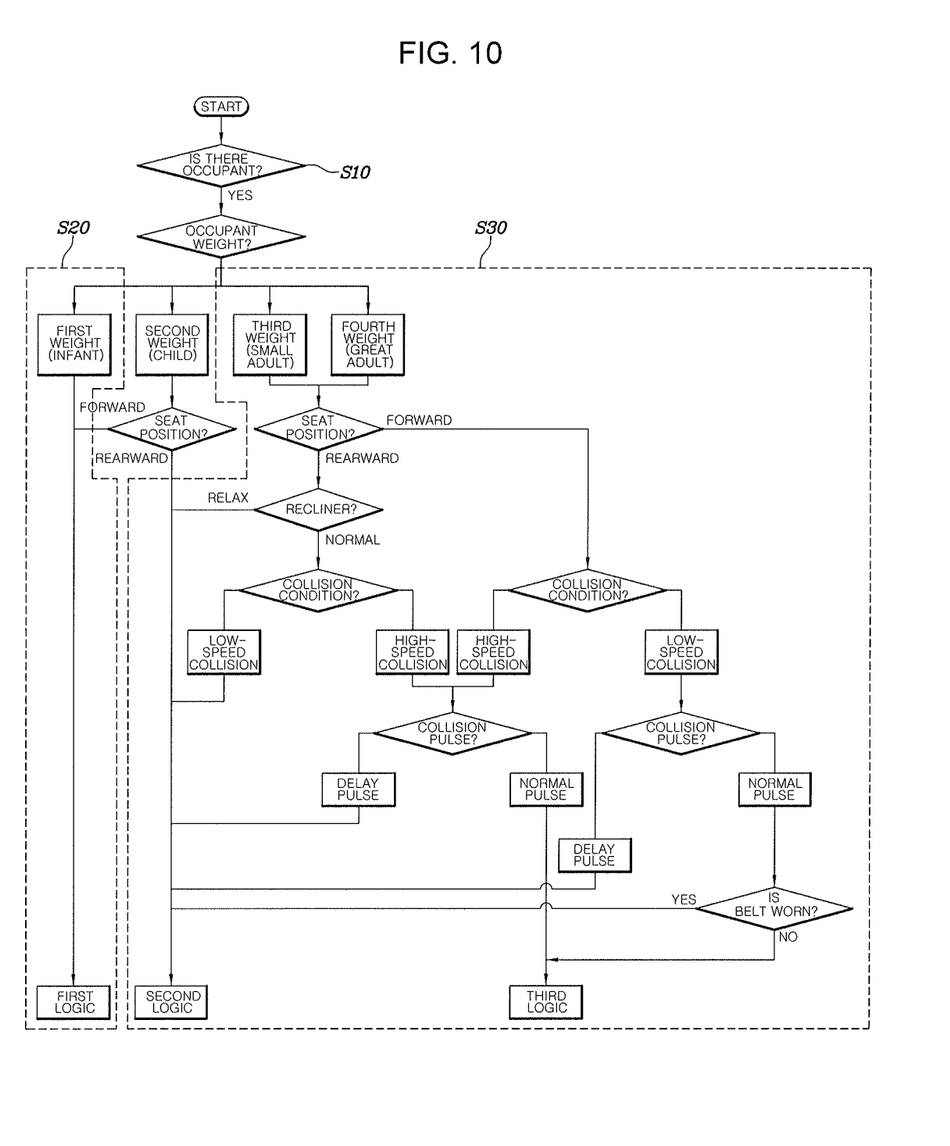
FIG. 10 is a flowchart illustrating a method of controlling an airbag inflator according to an exemplary embodiment of the present invention.

Hereinafter, a method of controlling an airbag inflator according to an exemplary embodiment of the present invention will be described with reference to FIG. 10.

For reference, the control method is on the premise that a vehicle collides and an airbag is deployed.

The method according to the exemplary embodiment includes a weight determination step (S10) of determining, when an occupant is accommodated on a seat, whether the weight of the occupant is in which of first to fourth weight ranges sequentially allocated by a controller CLR, a first response step (S20) of performing a first logic for operating an inflator at the lowest one of three intensities by the controller when it is determined that the weight of the occupant is in the lightest first weight range, a second response step (S30) of performing a second logic for operating the inflator at the intermediate intensity or a third logic for operating the inflator at the highest intensity by the controller according to conditions such as a position of a seat, a state of operation of a recliner, a collision condition, a collision pulse, and wearing of a belt when it is determined that the weight of the occupant is in the third or fourth weight range.

Figure 13:
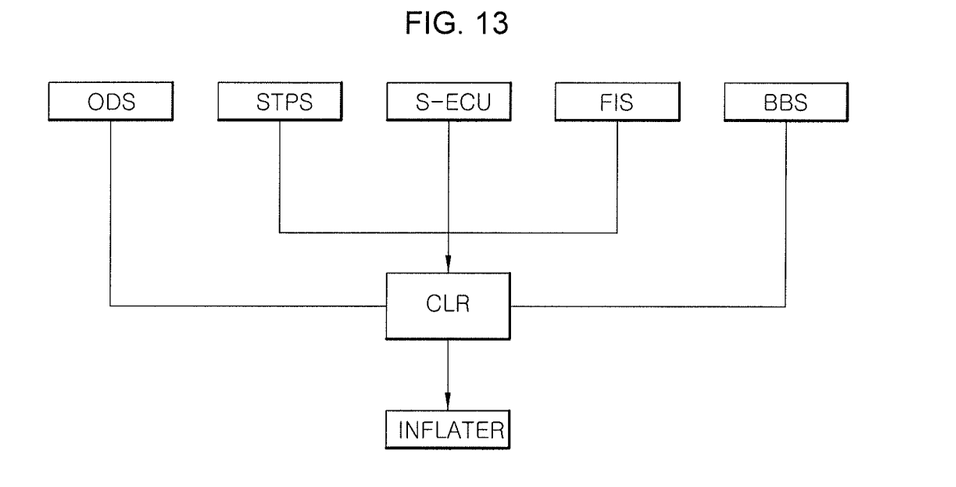
FIG. 13 is a block diagram illustrating an example of a controller and sensors that can perform the control method of the present invention.

That is, the controller CLR determines whether the occupant is accommodated on the seat by the signal provided from an occupant detection system (ODS) or the like. Furthermore, the controller acquires information on the weight of the occupant to determine whether the weight of the occupant currently accommodated on the seat is in which of the first to fourth weight ranges and separately perform the first response step (S20) and the second response step (S30).

Here, the weight range for determining the weight of the occupant is divided into first to four weight ranges. The first weight range includes infants, the second weight range includes children, the third weight range includes adults having relatively small weight such as adult women, and the fourth weight range includes adults having greater weight than the weight in third weight range. The weight in each range is a value which may be determined on design by a number of experiments and analyses.

Accordingly, when it is determined that the infant in the first weight range is accommodated on the passenger seat, the first logic is performed to operate the inflator at the lowest intensity and provide the buffer action of the airbag optimized for the infant in the first response step (S20).

Meanwhile, the controller CLR performs the first logic even when the weight of the occupant is in the second weight range and the seat is positioned forward thereof.

In the instant case, since the weight of the occupant is in the second weight range, the occupant is a child who is an elementary student greater than the infant. When such a child is accommodated on the seat pulled forward, the first logic is performed to provide the smooth buffer action of the airbag by operating the inflator with relative weakness.

For reference, the controller CLR may be an airbag control unit (ACU) or the like. The state in which the seat is pulled forward or pushed rearward may be detected by a seat track position sensor (STPS) or the like. The state of operation of the seat recliner may be detected by a seat electric control unit (S-ECU) or the like. The information on the collision condition and the collision pulse may be acquired by a front impact sensor (FIS) or the like. The information on whether the safety belt is worn may be acquired by a belt buckle sensor (BBS) or the like. On the basis of these types of information, the controller may operate the inflator according to the first, second, or third logic.

In the second response step (S30), when the seat is positioned forward, the controller is configured to determine the collision condition for high-speed collision or low-speed collision according to the magnitude of collision acceleration. When the collision condition is determined as the high-speed collision, the controller is configured to determine a collision pulse. When the collision pulse is a delay pulse, the controller performs the second logic, whereas when the collision pulse is a normal pulse, the controller performs the third logic.

That is, when the adult is basically accommodated on the seat in the second response step (S30), the inflator is operated according to the collision condition regardless of whether the recliner is operated when the seat is positioned forward thereof. When there is the high-speed collision and the collision pulse is the delay pulse, the second logic is performed to prepare for strong collision acceleration occurring in the second half of collision. When the collision pulse is the normal pulse, the third logic is performed to prepare for strong collision acceleration occurring relatively in the first half of collision.

Figure 11:
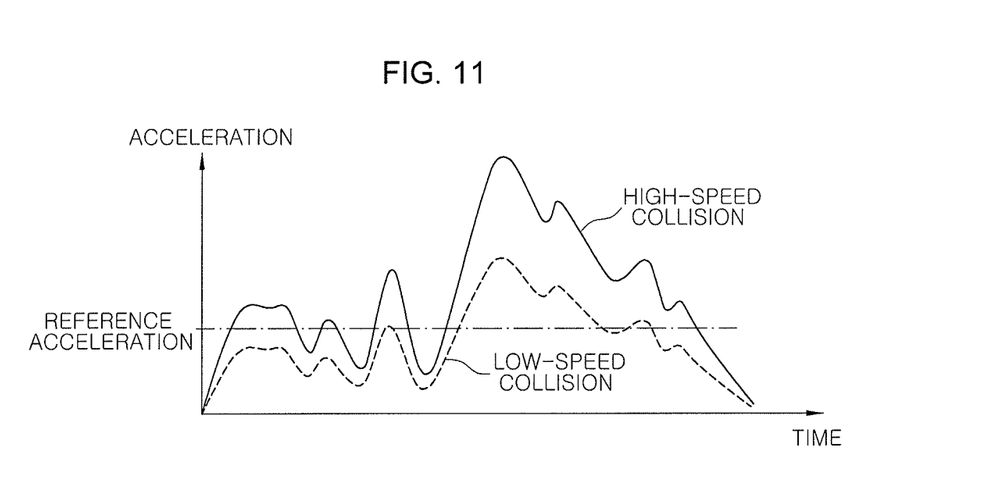
FIG. 11 is a graph illustrating a criterion for determining a collision condition In an exemplary embodiment of the present invention.

Here, the collision condition may be determined as the high-speed collision when the average value of the collision acceleration for a predetermined first reference time in the initial stage of vehicle collision is equal to or greater than a predetermined reference acceleration, whereas it may be determined as the low-speed collision when the average value of the collision acceleration is less than the reference acceleration, as illustrated in FIG. 11.

That is, the first reference time may be set to be, for example, 10 ms from the collision start time, etc., namely to be in an appropriate time period in the initial stage of vehicle collision that causes the airbag deployment, and the high-speed collision and the low-speed collision are distinguished depending on how large the average value of the collision acceleration during the present time period is.

Accordingly, the reference acceleration may be appropriately set by a number of experiments and analyses according to the above-mentioned purpose.

Figure 12:
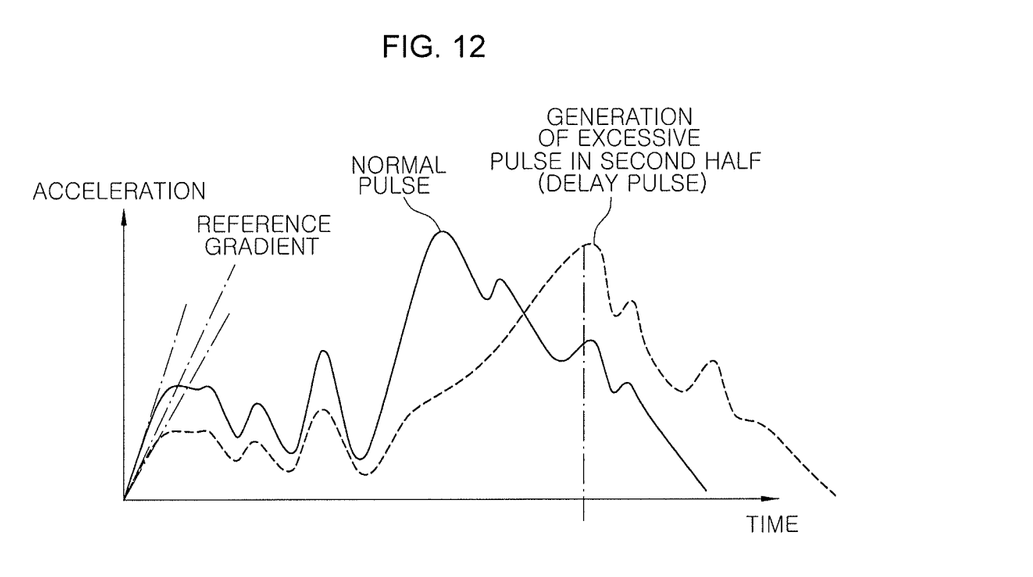
FIG. 12 is a graph illustrating a criterion for determining a collision pulse In an exemplary embodiment of the present invention.

Meanwhile, the collision pulse is determined as the normal pulse when the rising gradient of the collision acceleration during a predetermined second reference time in the initial stage of vehicle collision is equal to or greater than a predetermined reference gradient, whereas it is determined as the delay pulse when the rising gradient of the collision acceleration is less than the reference gradient, as illustrated in FIG. 12.

That is, the second reference time is set to be, for example, 10 ms from the collision start time, etc., and whether it is the normal pulse or the delay pulse is determined according to whether the gradient of the collision acceleration is larger or smaller than the reference gradient.

Here, the reference gradient is determined by checking the state in which the large collision acceleration occurs and appropriately setting the gradient in which the occurrence of the large collision acceleration is delayed in the second half through a number of experiments, as illustrated in FIG. 12, to distinguish the normal pulse and the delay pulse in the event of general collision.

In the second response step (S30), when the seat is positioned forward, the controller is configured to determine the collision condition for high-speed collision or low-speed collision according to the magnitude of collision acceleration. When the collision condition is determined as the low-speed collision, the controller is configured to determine a collision pulse. When the collision pulse is a delay pulse, the controller performs the second logic, whereas when the collision pulse is a normal pulse, the controller is configured to determine whether the safety belt is worn. When it is determined that the safety belt is worn, the second logic is performed, whereas when it is determined that the safety belt is not worn, the third logic is performed.

That is, in the case where the adult is accommodated on the seat pulled forward and the low-speed collision occurs, when the collision pulse is the delay pulse, the second logic is performed. In the normal pulse, when the safety belt is not worn, the third logic is performed to operate the inflator at the maximum intensity, whereas when the safety belt is worn, the second logic is performed since it is determined as the low-speed collision.

In the second response step (S30), when the seat is positioned rearward thereof, the controller performs the second logic when the recliner is in a relax state in which the recliner is tilted rearward thereof.

That is, when the seat is pushed rearward and the recliner is in the relax state in which it is tilted rearward thereof, it is appropriate for the adult to cope with the inflator at the intermediate intensity by the second logic regardless of the collision condition for high-speed collision or low-speed collision.

In the second response step (S30), when the seat is positioned rearward thereof, the controller is configured to determine the collision condition for high-speed collision or low-speed collision according to the magnitude of collision acceleration when the recliner is in a normal state in which the recliner is not tilted rearward thereof. When the collision condition is determined as the low-speed collision, the second logic is performed.

That is, when the seat is pushed rearward but the recliner is in the normal state, the controller is configured to determine the collision condition. When the collision condition is determined as the low-speed collision, the second logic is performed.

In the instant case, when the collision condition is determined as the high-speed collision, the controller is configured to determine the collision pulse. When the collision pulse is a delay pulse, the second logic is performed, whereas when the collision pulse is a normal pulse, the third logic is performed.

That is, when the seat is pushed rearward but the recliner is in the normal state, the controller is configured to determine the collision condition. When the collision condition is determined as the high-speed collision, the controller is configured to determine the collision pulse again. When it is determined that the collision pulse is a delay pulse, the second logic is performed to operate the inflator at the intermediate intensity, but when it is determined that the collision pulse is a normal pulse, the third logic is performed to operate the inflator at the maximum intensity.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A method of controlling an airbag inflator apparatus, the method comprising:
    determining, by a controller, when a weight of an occupant is in one of predetermined weight ranges sequentially allocated by the controller, while the occupant is accommodated on a seat;
    performing, by the controller, a first logic for operating the airbag inflator apparatus at a first intensity among predetermined intensities when it is determined that the weight of the occupant is in a first weight range among the predetermined weight ranges; and
    performing, by the controller, a second logic for operating the airbag inflator apparatus at a second intensity among the predetermined intensities or a third logic for operating the airbag inflator apparatus at a third intensity among the predetermined intensities by the controller, according to conditions including a position of the seat, a state of operation of a recliner, a collision condition, a collision pulse, and wearing of a belt, when it is determined by the controller that the weight of the occupant is in third or fourth weight range among the predetermined weight ranges,
    wherein in the performing a second logic or a third logic, when the seat is disposed forward, the controller is configured to determine a collision condition for high-speed collision or low-speed collision according to a magnitude of collision acceleration, in which case the controller is configured to determine a collision pulse when the collision condition is determined as the high-speed collision, so that the second logic is performed when the collision pulse is a delay pulse, but the third logic is performed when the collision pulse is a normal pulse.

2. The method according to claim 1,
    wherein the airbag inflator apparatus include a housing, a first chamber movably provided in the housing, a second chamber movably provided in the housing, a first igniter mounted in the first chamber and a second igniter mounted in the second chamber,
    wherein the controller is connected to the first igniter and the second igniter,
    wherein the first logic is for igniting only the first igniter,
    wherein the second logic is for igniting the first igniter and in a predetermined time period, igniting the second igniter, and
    wherein the third logic is for simultaneously igniting the first and second igniters.

3. The method according to claim 1, wherein the predetermined intensities are three intensities including a lowest intensity corresponding to the first intensity, an intermediate intensity corresponding to the second intensity, and a highest intensity corresponding to the third intensity.

4. The method according to claim 3,
    wherein when the weight of the occupant is in a second weight range among the predetermined weight ranges and the seat is disposed forward, the controller is configured to perform the first logic.

5. The method according to claim 3,
    wherein when the weight of the occupant is in a second weight range among the predetermined weight ranges and the seat is disposed rearward, the controller is configured to perform the second logic.

6. The method according to claim 1,
    wherein in the performing a second logic or a third logic, when the seat is disposed forward, the controller is configured to determine the collision condition for the high-speed collision or the low-speed collision according to the magnitude of the collision acceleration, in which case the controller is configured to determine the collision pulse when the collision condition is determined as the low-speed collision, so that the second logic is performed when the collision pulse is the delay pulse, whereas the controller is configured to determine when a safety belt is worn when the collision pulse is the normal pulse, in which case the second logic is performed when it is determined by the controller that the safety belt is worn whereas the third logic is performed when it is determined by the controller that the safety belt is not worn.

7. The method according to claim 1,
    wherein in the performing a second logic or a third logic, when the seat is disposed rearward thereof, the controller is configured to perform the second logic when the recliner is in a relax state in which the recliner is tilted rearward thereof.

8. The method according to claim 1,
    wherein in the performing a second logic or a third logic, when the seat is disposed rearward thereof, the controller is configured to determine the collision condition for the high-speed collision or the low-speed collision according to the magnitude of the collision acceleration when the recliner is in a normal state in which the recliner is not tilted rearward thereof, so that when the collision condition is determined as the low-speed collision, the second logic is performed.

9. The method according to claim 1,
wherein in the performing a second logic or a third logic, when the seat is disposed rearward thereof, the controller is configured to determine the collision condition for the high-speed collision or the low-speed collision according to the magnitude of the collision acceleration when the recliner is in a normal state in which the recliner is not tilted rearward thereof, in which case the controller is configured to determine the collision pulse when the collision condition is determined as the high-speed collision, so that the second logic is performed when the collision pulse is the delay pulse, but the third logic is performed when the collision pulse is the normal pulse.

10. The method according to claim 1,
wherein the collision condition is determined as the high-speed collision when an average value of the collision acceleration for a predetermined first reference time in an initial stage of vehicle collision is equal to or greater than a predetermined reference acceleration, and
wherein the collision condition is determined as the low-speed collision when the average value of the collision acceleration is less than the predetermined reference acceleration.

11. The method according to claim 1,
wherein the collision pulse is determined as the normal pulse when a rising gradient of the collision acceleration during a predetermined second reference time in an initial stage of vehicle collision is equal to or greater than a predetermined reference gradient, and
wherein the collision pulse is determined as the delay pulse when the rising gradient of the collision acceleration is less than the predetermined reference gradient.

* * * * *